(12) United States Patent
Kanzawa

(10) Patent No.: US 6,463,663 B1
(45) Date of Patent: Oct. 15, 2002

(54) FOLDING SAW

(75) Inventor: Kuniyuki Kanzawa, Miki (JP)

(73) Assignee: Kanzawa Seiko Co., Ltd., Hyogo (JP)

( * ) Notice: Subject to any disclaimer, the term of this patent is extended or adjusted under 35 U.S.C. 154(b) by 0 days.

(21) Appl. No.: 09/665,480

(22) Filed: Sep. 20, 2000

(30) Foreign Application Priority Data

Sep. 24, 1999 (JP) ............................................ 11-270273
Apr. 12, 2000 (JP) ........................................ 2000-110794

(51) Int. Cl.[7] ............................................. B27B 21/00
(52) U.S. Cl. .......................... 30/160; 30/166.3; 30/504; 30/517
(58) Field of Search ........................ 30/160, 155, 159, 30/161, 517, 518, 519, 504, 166.3

(56) References Cited

U.S. PATENT DOCUMENTS

| | | | | |
|---|---|---|---|---|
| 338,853 A | * | 3/1886 | Marks | 30/143 |
| 744,934 A | * | 11/1903 | Owens | 30/155 |
| 770,118 A | * | 9/1904 | Rowland | 30/161 |
| 924,070 A | * | 6/1909 | Holman | 30/161 |
| 1,638,749 A | * | 8/1927 | Santoyo | 30/161 |
| 4,203,214 A | * | 5/1980 | Fogle | 30/355 |
| D383,370 S | * | 9/1997 | Chen et al. | D8/107 |
| 5,781,998 A | * | 7/1998 | Stamper | 30/139 |
| 5,924,210 A | * | 7/1999 | Hung | 30/519 |
| 5,926,962 A | * | 7/1999 | Chen | 30/519 |
| 6,253,455 B1 | * | 7/2001 | Eriksson et al. | 30/504 |

\* cited by examiner

Primary Examiner—Boyer Ashley
Assistant Examiner—Thomas J Druan, Jr.
(74) Attorney, Agent, or Firm—Koda & Androlia

(57) ABSTRACT

A folding saw in which either the edge of the blade, the handle or both are curved, to prevent the edge of the blade from being exposed when blade is folded so that the saw can be handled safely. The protective cover in which the edge of the blade can be nestled is placed inside the housing groove of the handle having a semi-U-shaped cross section for housing the blade. The protective cover is retractable with respect to the housing groove, and when the blade is folded, projects out of the housing groove and covers the edge, which may be exposed. The protective cover is preferably energized by a spring so that it covers the edge whenever the blade is folded.

2 Claims, 12 Drawing Sheets

FOLDING SAW

BACKGROUND OF THE INVENTION

1. Field of the Invention

The present invention relates to a handsaw that can be folded into a handle (hereinafter referred to as a "folding saw"). In more particular, the present invention relates to a saw in which the blade is pivotally attached by its base end to the top end of a handle having a U-shaped cross section and can be revolved to-be folded-into the handle when not in use so as to be used as a pruning saw, a gardening saw or as a crafting saw.

2. Prior Art

A conventional folding saw has a straight blade pivotally attached by its base end to the top end of a straight handle. When the blade is folded into the handle, the edge is completely housed within the handle. Recently, however, as shown in FIGS. 15(a) and 15(b) saws having a concavely curved blade A and a concavely curved edge B have come into widespread use for pruning trees. Such saws having a concavely curved blade edge are generally called curved saws. Compared with a conventional saw with a straight blade, a curved saw is less likely to disengage from the object of cutting, so it is easier to cut the object using such a saw.

Accordingly, a folding saw having a concavely curved edge B housed in handle C which is also concave in the same direction as the edge B as shown in FIGS. 15(a) and 15(b) has been developed. Other variations of the folding saw include those having a concave edge and a straight handle and those combining a straight edge with a concave handle.

A folding saw combining a concavely curved edge and a straight handle has a mildly curved form when unfolded as shown in FIG. 15(a). When the blade is folded, however, a portion of the edge, in particular, the middle portion of the curved edge, is exposed as shown in FIG. 15(b). This is dangerous because this exposed portion E can injure a finger or damage an object while the folding saw is being carried or stored. The edge itself can also be damaged by another object that accidentally comes into contact with it.

SUMMARY OF THE INVENTION

The object of the present invention is to provide a handsaw that can overcome these defects inherent in the conventional saws by protecting the exposed edge part of the blade with a protective cover.

To achieve the object mentioned above, the present invention includes a protective cover which can be pulled out or pushed into the housing groove of the handle for housing the blade. When the blade is folded, the protective cover housed in the housing groove is pushed out of the housing groove so as to cover the edge of the blade exposed from the housing groove of the handle.

In order to allow the protecting cover covering the edge of the blade to project out of the housing groove, the protective cover is pivotally supported by a pivot which is inside the housing groove and is located near the end of the handle. The protective cover can be revolved around the pivot so as to be retracted into the housing groove. In this condition, the protective cover is energized by a first spring so that it is constantly pushed into the housing groove, and when the top end of the folded blade pushes a portion of the protective cover between the pivot and the bottom end of the handle, the protective cover pivotally projects out of the housing groove, against the resiliency of the first spring. In this way, when the blade is folded, the protective cover covers the blade, and when the blade is unfolded into a ready-to-cut condition, the protective cover is housed inside the housing groove.

At this time, at the top end of the handle at the point where the blade is pivotally attached, a stopper is preferably provided so that the blade is stopped at the working position at which the blade is fully open for cutting objects and at the folding position at which the blade is fully folded, and that the protective cover forcibly holds the blade at the housed position at which the blade is folded, against the resiliency of the first spring. More specifically, when the blade is opened slightly, the edge becomes exposed from the housing groove accordingly, and at the same time, the protective cover moves towards the housing groove, causing the edge to be further exposed. To prevent this, the stopper that stops the blade at its folded and housed position is provided so that the blade does not open unintentionally while it is being carried.

The protective cover which revolves around the pivot at the bottom end of the handle may be designed so that it can be pulled out of or pushed into the housing groove by means of the force of a second spring positioned between the pivot and the middle of the handle. Instead of using the spring to allow the protective cover to retract or emerge, the protective cover may be provided with an opener that sticks out of the handle, so that the opener can be operated by a finger so as to retract the protective cover into or emerge from the housing groove.

BRIEF DESCRIPTION OF THE INVENTION

Figure 6A:
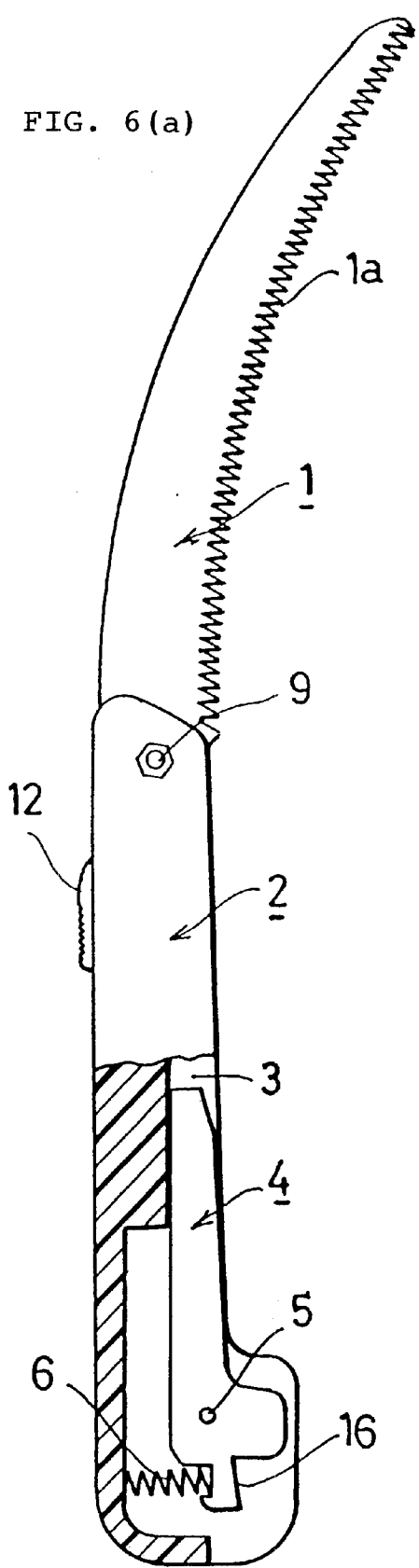
Figure 6B:
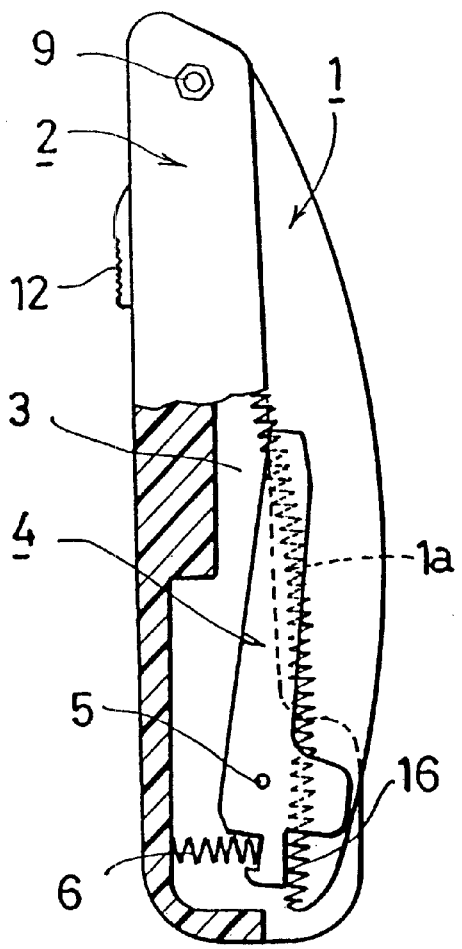
Figure 7A:
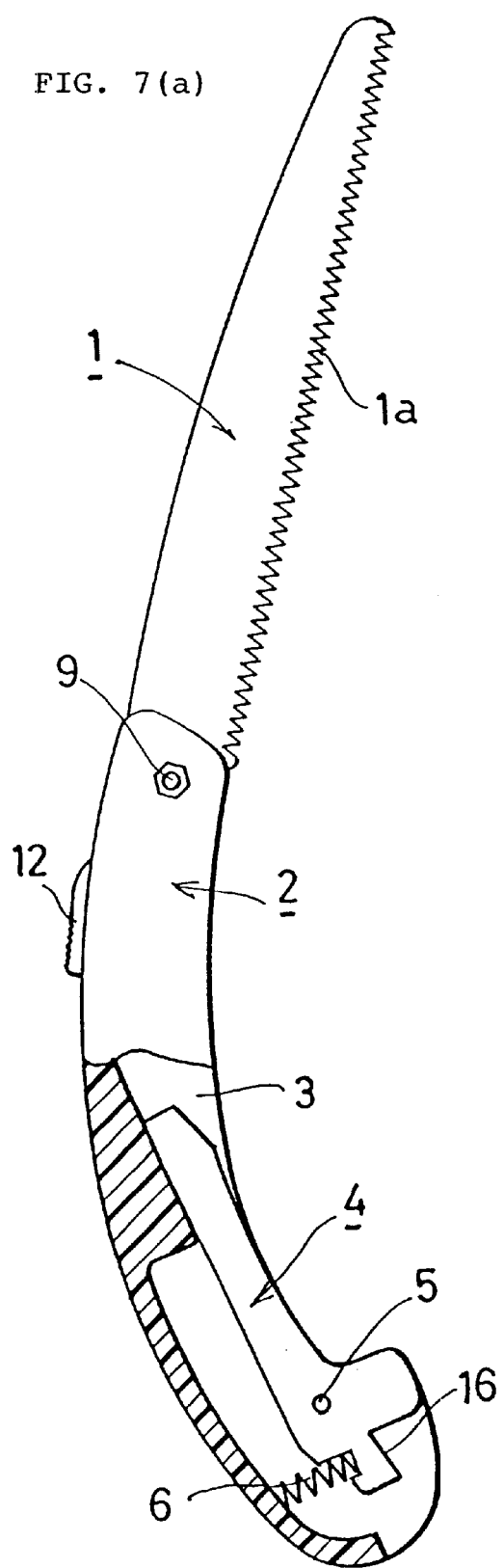
Figure 7B:
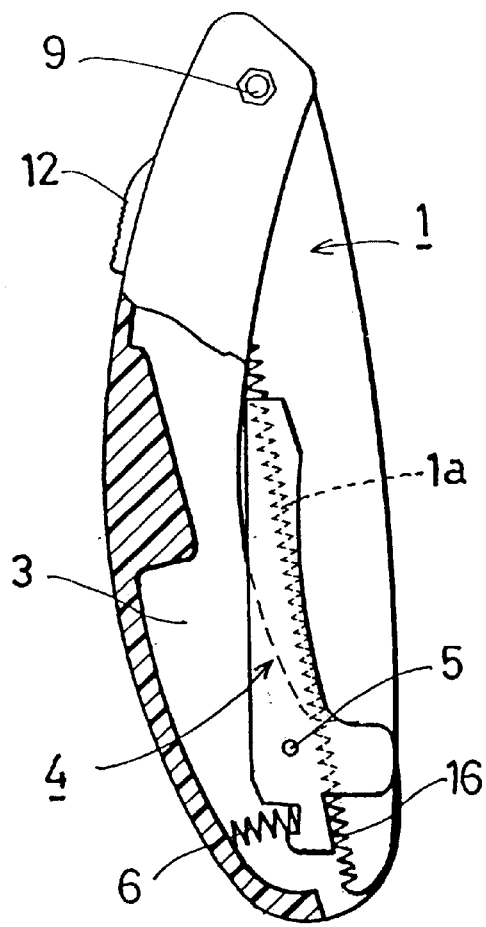
Figure 8:
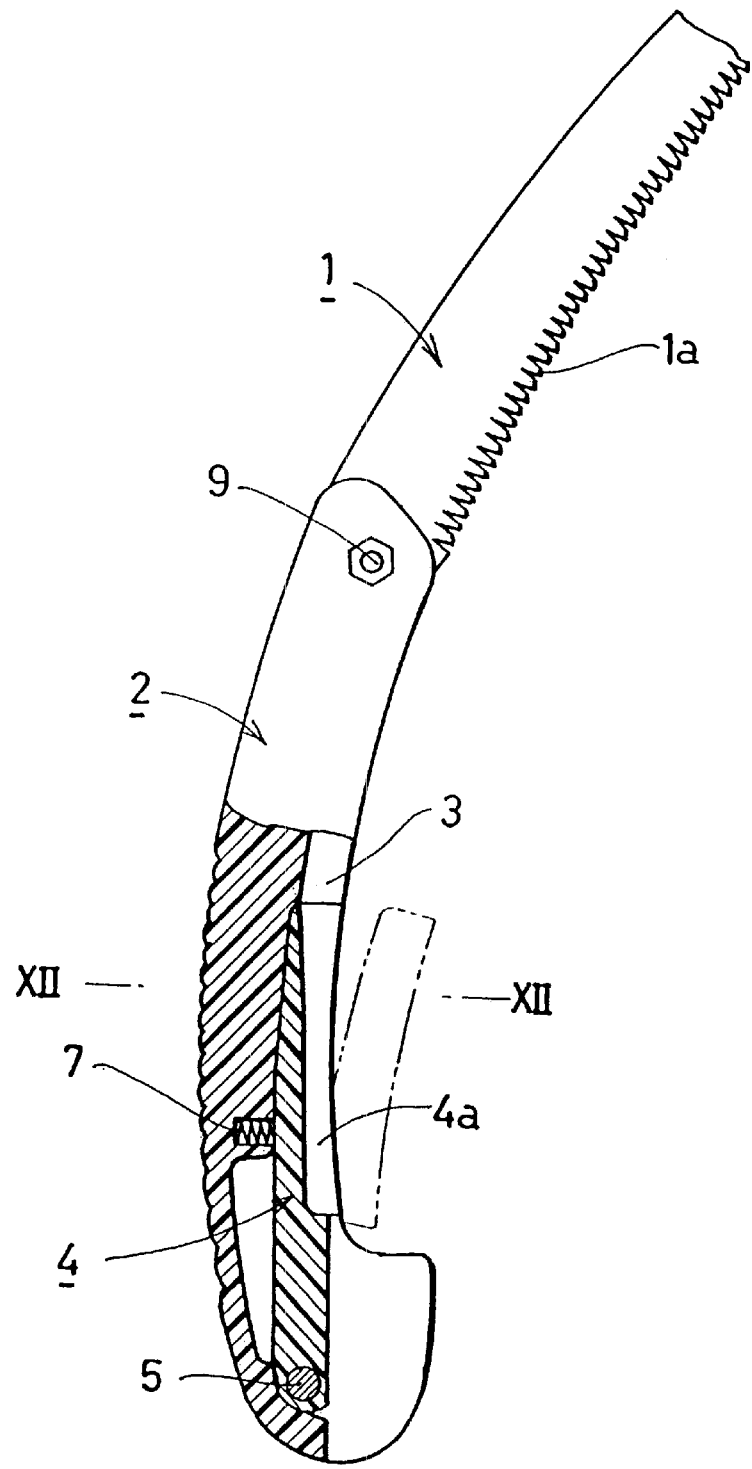
Figure 9:
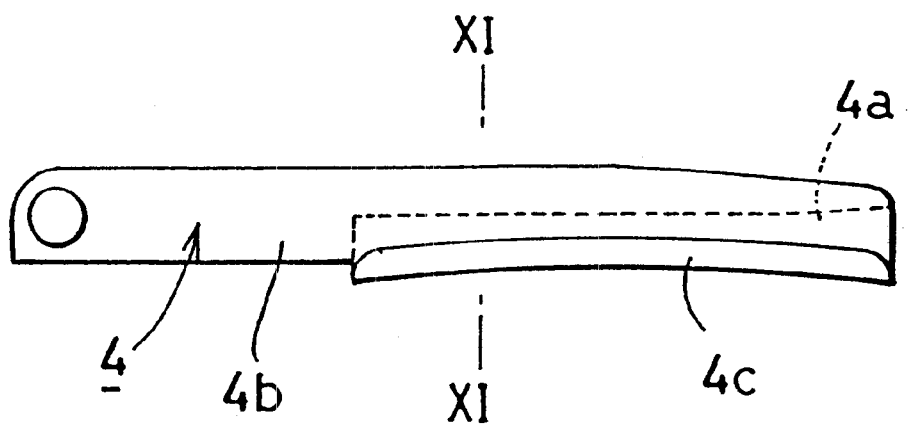
Figure 10:
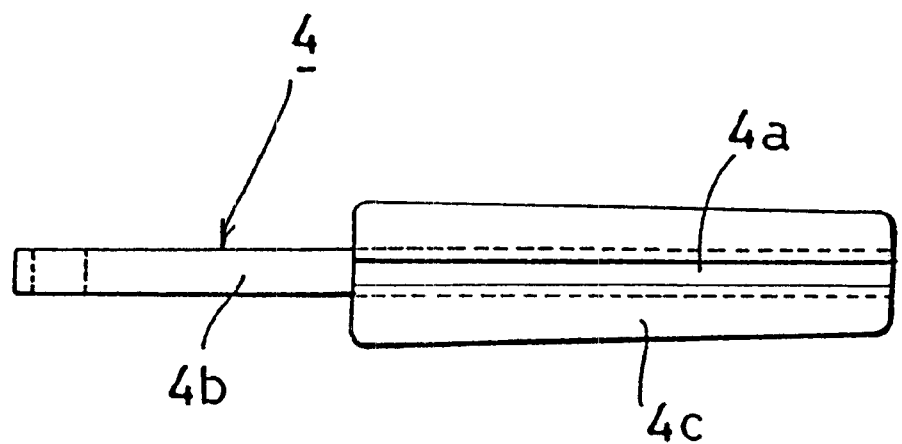
Figure 11:
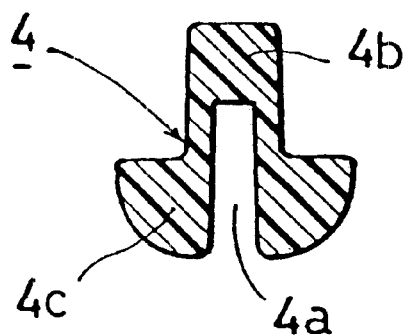
Figure 12A:
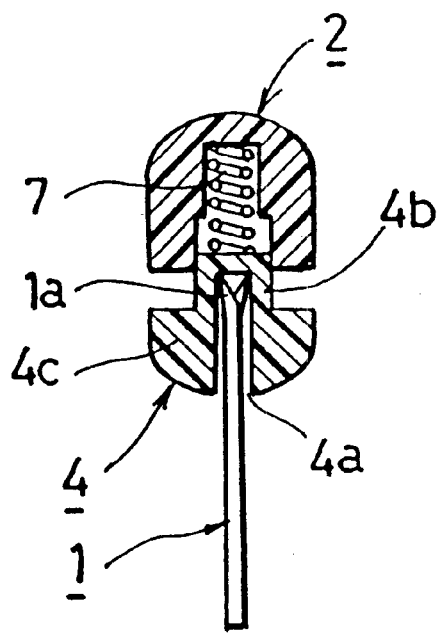
Figure 12B:
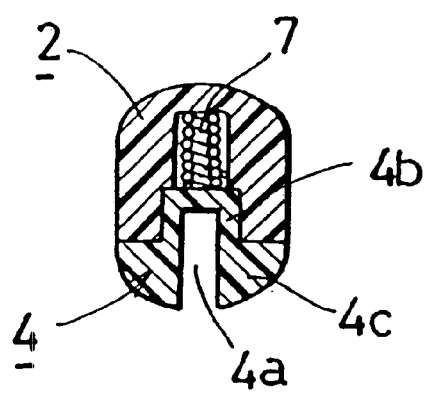
Figure 13:
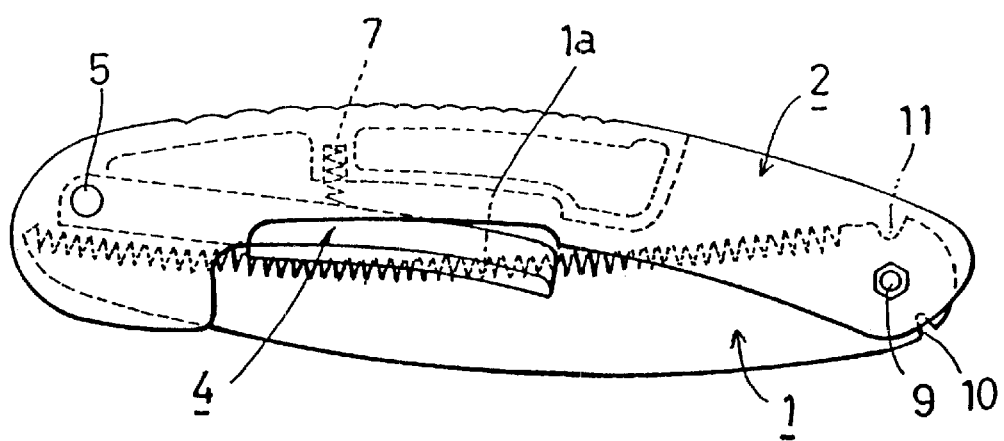
Figure 14:
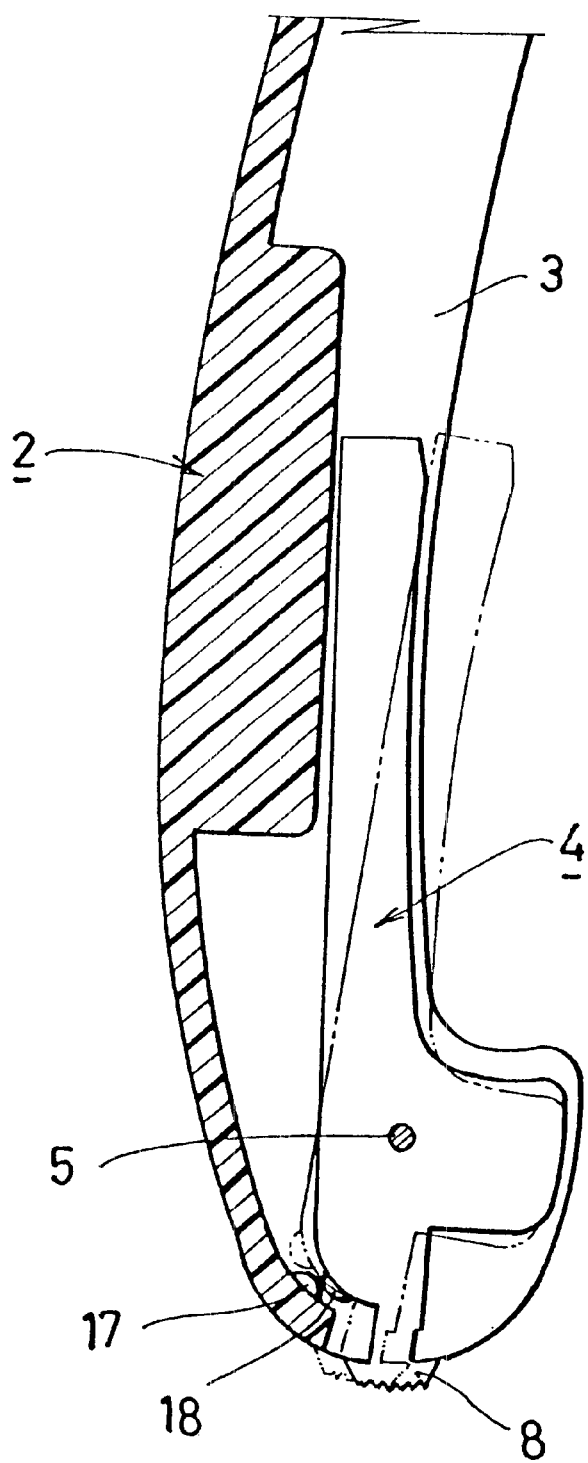
Figure 15A:
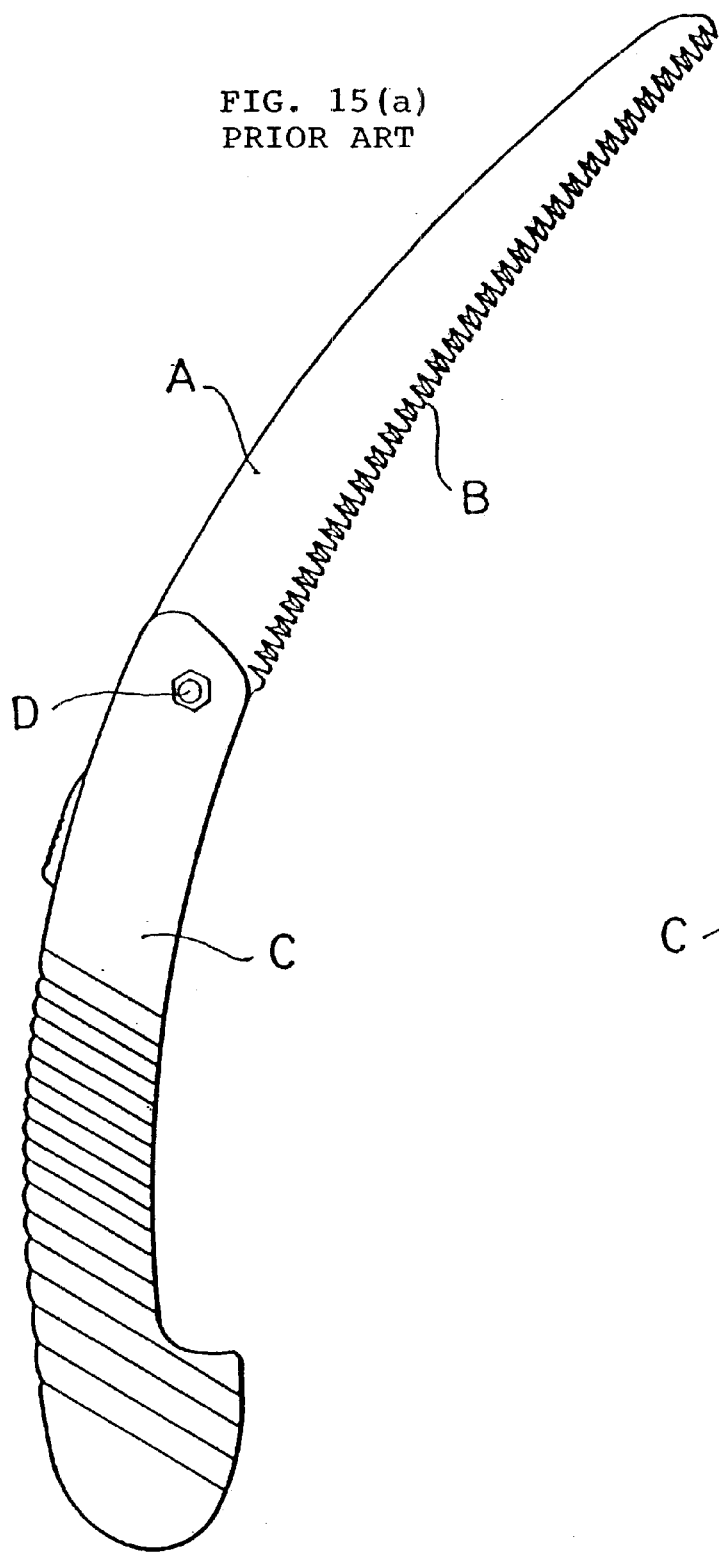
Figure 15B:
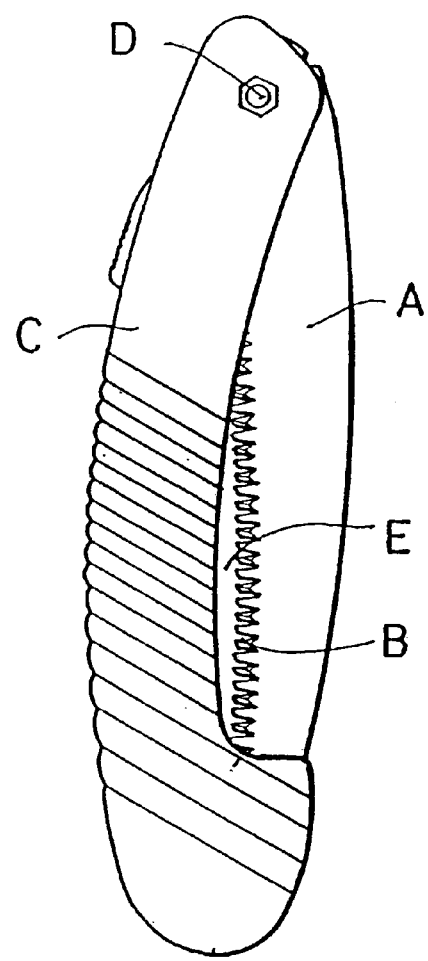

FIGS. 6(a) and 6(b) are partially cut front views of a folding saw in another embodiment;

FIGS. 7(a) and 7(b) are partially cut front views of a folding saw in yet another embodiment;

FIG. 8 is a partially cut front view of a folding saw with its blade completely unfolded in yet another embodiment;

FIG. 9 is a front view of the protective cover of the embodiment shown in FIG. 8;

FIG. 10 is a plan view of the protective cover of the embodiment shown in FIG. 8;

FIG. 11 is a cross sectional view taken along the line XI—XI of FIG. 9;

FIGS. 12(a) and 12(b) are cross sectional views taken along the line XII—XII of FIG. 8, of which FIG. 12(a) shows the condition in which the edge is protected; and FIG. 12(b) shows the condition in which the handle is grasped together with the protective cover after unfolding the blade;

FIG. 13 is a front view of the folding saw shown in FIG. 8 with its blade folded;

FIG. 14 is a longitudinal section view of a folding saw in yet another embodiment, showing a portion of the handle housing the protective cover; and FIGS. 15(a) and 15(b) are front views of an example of a conventional folding saw.

DETAILED DESCRIPTION OF THE PREFERRED EMBODIMENTS

Preferred embodiments of the present invention will now be described with reference to the accompanying drawings.

Figure 1:
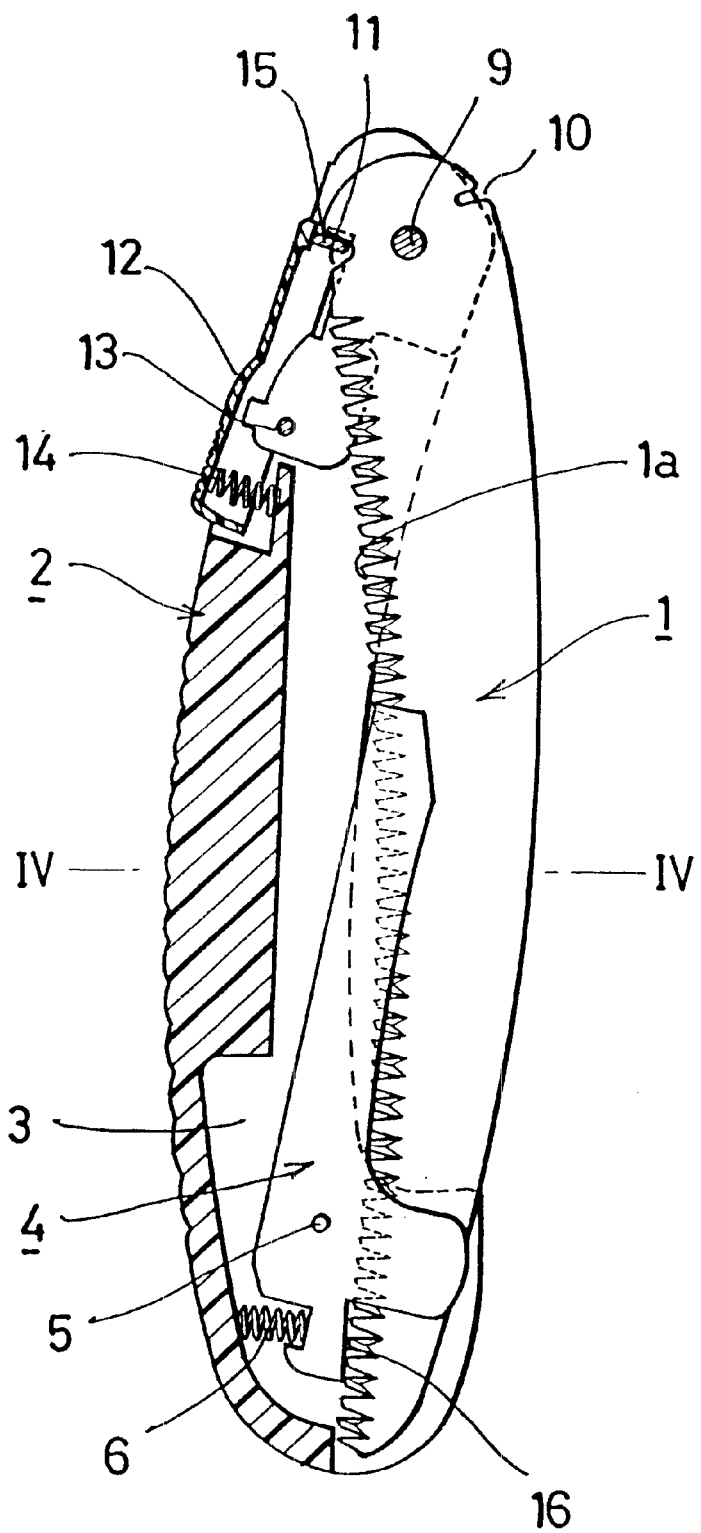
FIG. 1 is a longitudinal section view of an embodiment of a folding saw according to the present invention with its bladed folded.
Figure 2:
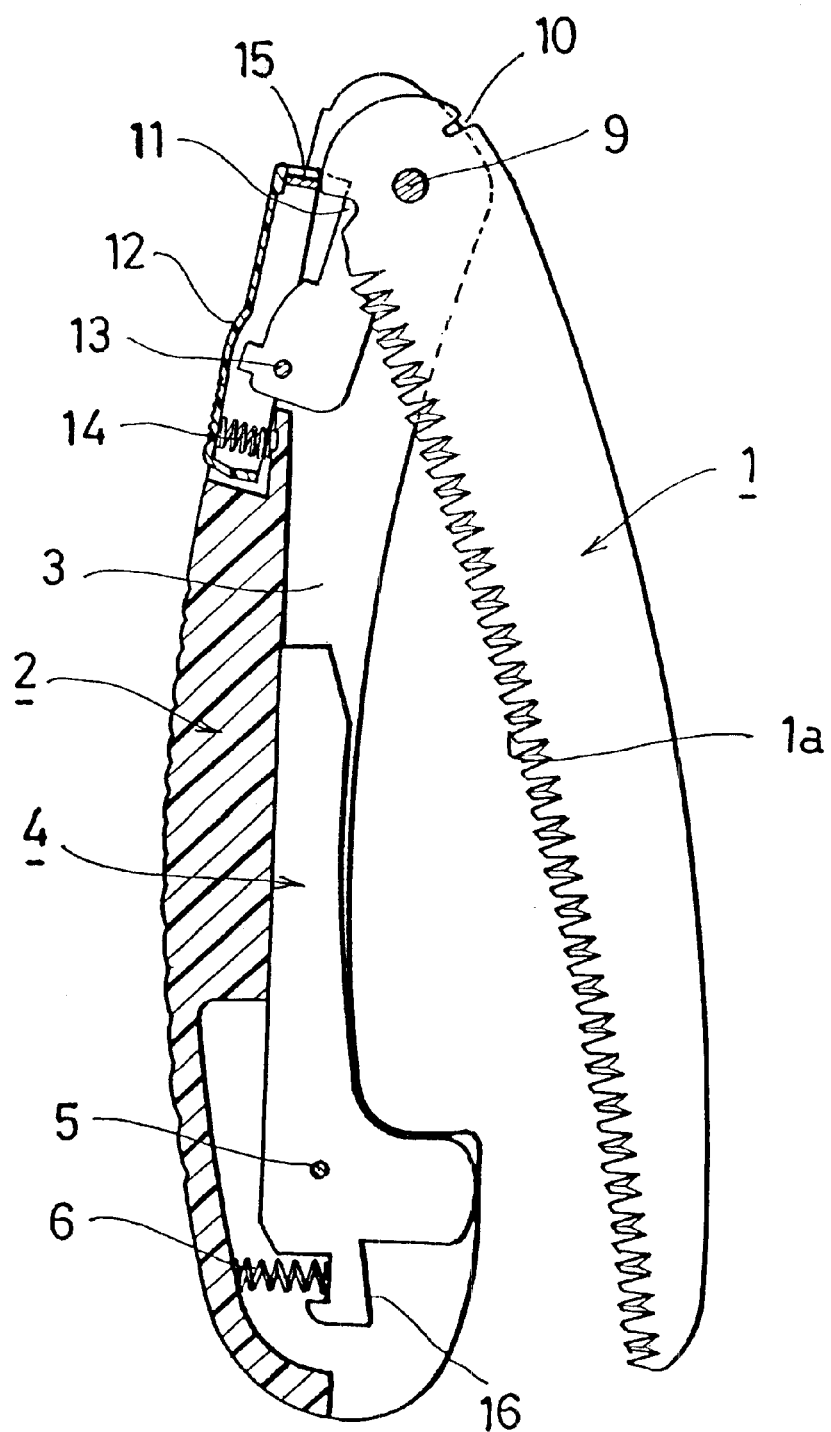
FIG. 2 is a longitudinal section view of the same folding saw as in FIG. 1 with its blade slightly unfolded.
Figure 3:
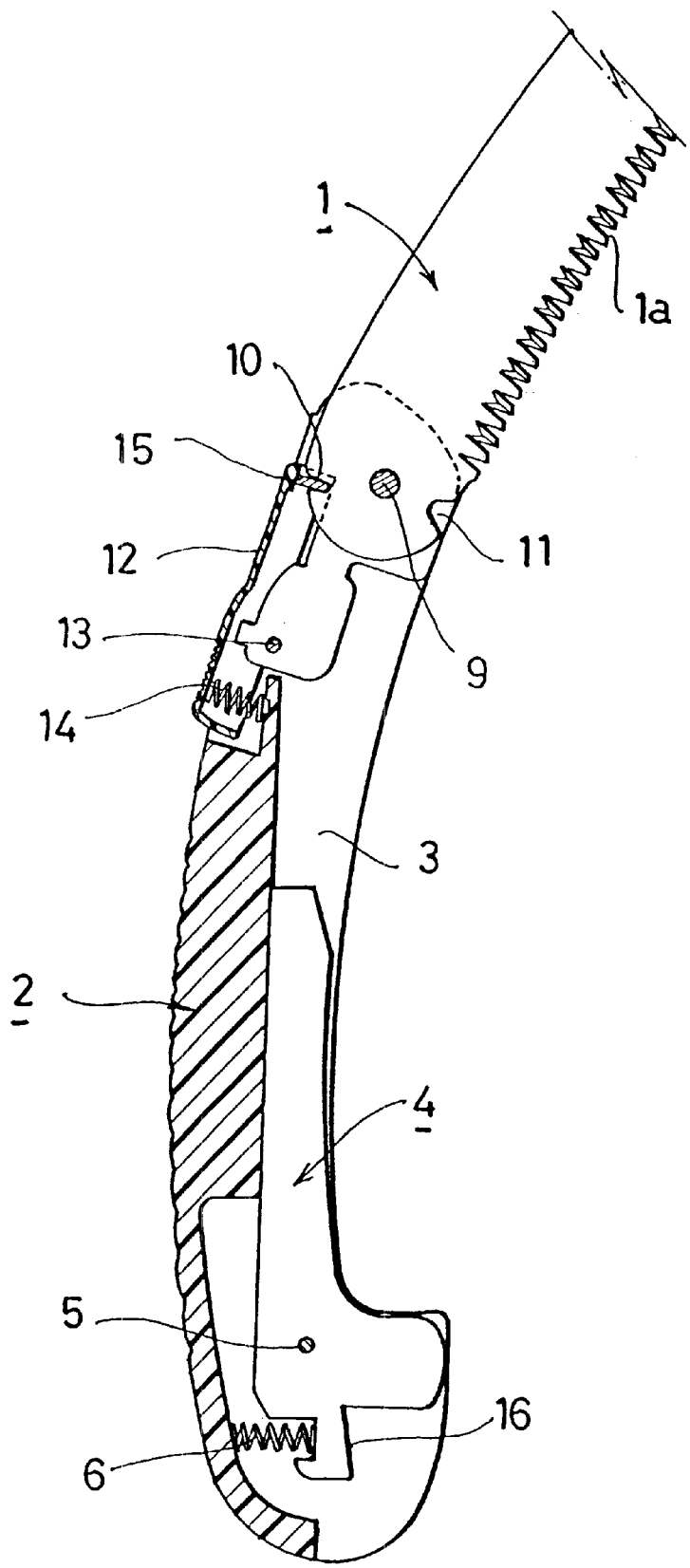
FIG. 3 is a longitudinal section view of the same folding saw as in FIG. 1 with its blade completely unfolded.

In the embodiments shown in FIGS. 1 to 5, a concavely curved blade 1 is pivotally supported by a pivot 9 at the top end of a concavely curved handle 2. When the blade 1 is revolved and folded, the edge 1a of the blade 1 is housed within the housing groove 3 of the handle 2 having a semi-U-shaped cross section. At the base end of the blade 1, two cuts 10, 11 are formed on the circular arc centered around the pivot 9. A stopper 12 is provided on the handle 2. The stopper 12 engages the cuts 10, 11 to hold the blade 1 in a folded condition as shown in FIG. 1 and in a ready-to-cut condition as shown in FIG. 3, respectively. The stopper 12 is pivotally supported by a pivot 13 and energized by a spring 14 so that a claw 15 at its tip engages either of the cuts 10, 11. This foldable saw can be carried, stored or otherwise handled with its blade folded.

Figure 4:
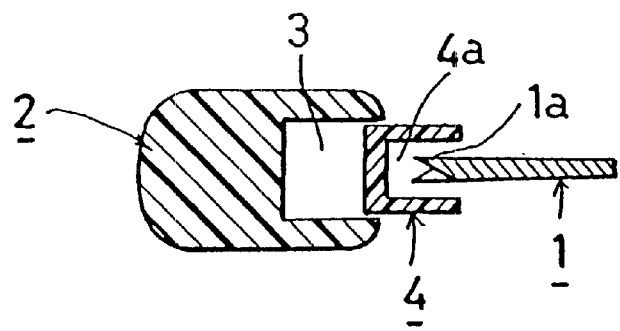
FIG. 4 is a cross sectional view taken along the line IV—IV of FIG. 1.
Figure 5:
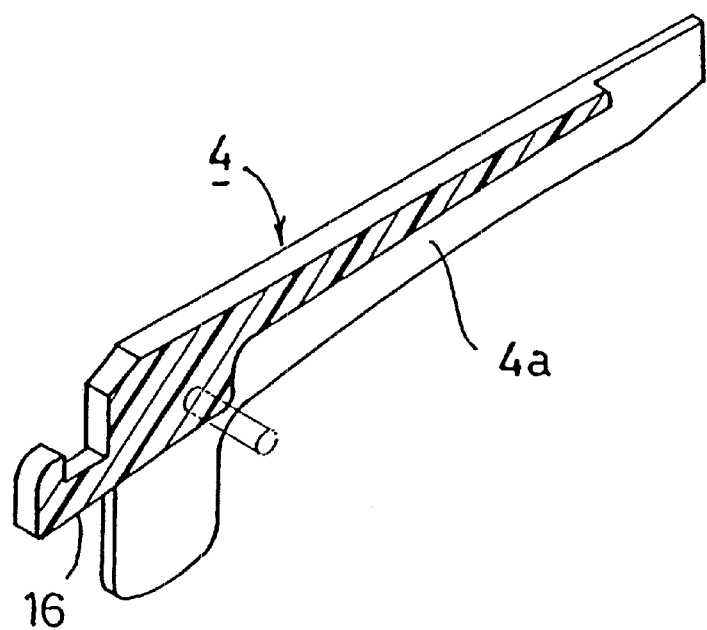
FIG. 5 is a semi cross sectional perspective view showing only the protective cover of the folding saw shown in FIG. 1.

Inside the housing groove 3 of the handle 2 having a semi-U-shaped cross section, a protective cover 4 having a semi-U-shaped cross section and capable of housing the edge 1a of the blade 1 within its own groove 4a from the open side is provided as shown in FIGS. 4 and 5. The protective cover 4 revolves around the pivot 5 located at the bottom end of the handle within the housing groove 3. The top end of the protective cover 4 is energized by a spring 6 which is positioned between the pivot 5 and the bottom end of the handle so that the protective cover 4 is constantly pushed into the housing groove 3. At the base end of the protective cover 4, i.e., the part closer to the bottom of the handle, a contact surface 16 is formed. The top end of the blade 1 comes into contact with this part.

The folding saw described in FIGS. 1 to 5 above operates as follows. When the blade 1 is revolved around the top end of the handle 2 so that it is ready to cut as shown in FIG. 3, the claw 15 of the stopper 12 provided at the top end of the handle 2 engages with the cut 10 formed at the base end of the blade 1. At this time, the resiliency of the spring 14 works to maintain the engagement, and the protective cover 4 arranged inside the housing groove 3 is pushed by the resiliency of the spring 6 towards the inside of the housing groove 3 so that it does not project out of the profile of the handle 2.

When the base end of the stopper 12 is pressed from the condition shown in FIG. 3, the claw 15 is raised against the resiliency of the spring 14, disengaging the stopper from the cut 10. The blade 1 can then be revolved in the folding direction as shown in FIG. 2. When the blade is further revolved from the condition shown in FIG. 2, the top end of the blade 1 enters into the housing groove 3 of the handle 2, and the top end of the edge 1a comes into contact with the contact surface 16 of the protective cover 4. As the blade 1 is pressed deeper into the housing groove 3 of the handle, the protective cover 4 revolves outward against the resiliency of the spring 6, and the top portion projects out of the housing groove 3 as shown in,FIG. 1. The portion of the protective cover 4 projecting out of the housing groove 3 covers the middle portion of the edge 1a that is not completely housed inside the housing groove 3 of the handle 2. In this way, it is possible to prevent the edge of the blade from coming into contact with and injuring a finger or damaging an object while the saw is being carried or otherwise handled.

In the ready-to-cut condition shown in FIG. 1, the cut 11 formed on the base end of the blade is engaged by the claw 15 of the stopper 12, thereby locking the blade 1. In this way, the condition in which the protective cover 4 covers the blade edge 1a is firmly maintained. The resiliency of the spring 6 works in the direction to return the protective cover 4 to the inside of the housing groove 3 of the handle 2. The protective cover 4 acts on the blade via the contact surface 16 to open the blade, but because a locking device, i.e., the stopper, is provided, the ready-to-cut condition in which the blade is folded is stably maintained despite the resiliency of the spring 6.

FIG. 6 shows an embodiment of a folding saw combining a concavely curved blade 1 and a straight handle 2. As in the previously described embodiment, this embodiment also includes a protective cover 4 inside the housing groove 3 of the handle 2 having a semi-U-shaped cross section. FIG. 6(a) shows a ready-to-cut condition in which the blade 1 is unfolded, and FIG. 6(b) shows a ready-to-carry condition in which the blade 1 is folded. The movement of the protective cover is similar to that in the above embodiment. As shown in FIG. 6(b), the protective cover, which is designed to revolve inside the housing groove, covers a portion of the blade 1, more specifically, the portion of the concavely curved edge 1a that is exposed from the housing groove 3 of the straight handle 2.

FIGS. 7(a) and 7(b) show yet another embodiment of a folding saw combining a blade 1 having a straight edge 1a and a concavely curved handle 2. This embodiment also includes a protective cover 4 inside the housing groove 3 of the handle 2 having a semi-U-shaped cross section as in the previously described embodiments. FIG. 7(a) shows the ready-to-cut condition in which the blade 1 is unfolded, and FIG- 7(b) shows the ready-to-carry condition in which the blade 1 is folded. The movement of the protective cover is similar to that previously explained with respect to FIGS. 1 to 3. As shown in FIG. 7(b), the protective cover, which is provided inside the concavely curved housing groove, covers a portion of the blade 1, more specifically, the portion of the straight edge 1a that is exposed from the housing groove 3 of the concavely curved handle 2.

The embodiment shown in FIGS. 8 to 13 also includes a protective cover inside the housing groove 3 of the handle 2:, as in the embodiments shown in FIGS. 1 to 7(b), and this protective cover revolves around the pivot 5 which is positioned close to the bottom end of the handle. What makes this embodiment different from the other embodiments is that a spring 7 is provided at a position between the pivot 5 and the middle of the handle 2, and this spring 7 energizes the protective cover 4 housed inside the housing groove 3 so that the protective cover 4 is constantly pushed outwards from the housing groove 3. Because of this, when the blade 1 unfolded, the protective cover 4 projects out of the housing groove of the handle 2 as indicated by the two-dot chain lines in FIG. 8. When the blade 1 is folded towards the handle 2 from the condition shown in FIG. 8, the edge 1a first comes into contact with the protective cover 4, then enters the protective cover groove 4a, and in that condition, pushes the protective cover 4 into the housing groove 3. As such, when the blade is completely folded as shown in FIG. 13, the protective cover is constantly energized to cover the edge 1a of the blade, making it safe to carry.

On the other hand, when the blade shown in FIG. 8 is unfolded and ready to cut, the protective cover 4 projects out of the profile of the handle 2, posing an obstacle when one grabs the handle. To lessen this inconvenience, the embodiment shown in FIG. 8 employs a special shape for the protective cover 4. Specifically, the protective cover 4, which revolves around the pivot 5, comprises a narrow part 4b which enters the housing groove 3 and does not affect the holding of the handle 2 and a wide part 4c which projects out of the housing groove 3. As shown in FIG. 11, the cross section of the outside of the wide part 4c (the lower half in FIG. 11) has a cross section that forms a continuous profile with the cross section of the handle 2.

When the blade 1 is folded in a ready-to-carry condition as shown in FIG. 12(a), the edge 1a of the blade enters into the groove 4a of the protective cover 4. This condition is maintained by the resiliency of the spring 7. When the handle 2 is grasped with the blade 1 in its ready-to-cut condition and the protective cover 4 projecting, the narrow part 4b of the protective cover 4 is pushed inside the housing groove of the handle against the resiliency of the spring 7. In this condition, the wide part 4c comes into close contact with the handle 2 as shown in FIG. 12(b), forming an easy-to-grasp shape in combination with the handle.

In all of the embodiments described above, the protective cover 4 is activated by a spring. But the protective cover need not be energized by a spring as long as it is capable of covering the edge part of the blade. The embodiment shown in FIG. 14 includes a protective cover which is revolvable around the pivot 5 and equipped with an opener 8. One can operate the opener to pull out the protective cover 4 from the housing groove 3. Specifically, the opener 8 projects from the bottom-of-the-handle side of the pivot 5. Preferably, the handle 2 is provided with an engagement protrusion 17 facing the housing groove 3, and the protective cover 18 is provided with an engagement protrusion 18 for engaging with the engagement protrusion 17 so that the protrusions form a click mechanism that maintains the protective cover in the housing groove or in the projected condition.

According to the folding saw of the present invention in which either the edge of the blade, the handle or both are curved in a concave shape, the edge part that is exposed from the housing groove of the handle when the blade is folded is covered by a protective cover. A folding saw equipped with such a protective cover is safe because the edge of the blade cannot injure the holder while being carried. In addition to protecting the holder, this folding saw has the effect of preventing the edge from accidentally coming into contact with and damaging other objects or, conversely, being damaged by such contact.

According to the present invention, the protective cover attached to the handle is constantly housed inside the housing groove of the handle, without posing an obstacle when holding the handle. When the blade is folded, the protective cover is projected against the resiliency of the spring, thereby firmly protecting the edge part of the blade.

According to the present invention, the folded condition in which a part of the blade presses a part of the protective cover against the resiliency of the spring is firmly maintained, completely eliminating the possibility that the blade will open slightly due to the resiliency of the spring and exposing the blade edge.

According to the present invention, the blade is folded until eventually the protective cover is pressed against the edge of the blade due to the resiliency of the spring, when the edge of the blade is completely covered by the protective cover, so that a condition in which the edge of the blade is inadvertently exposed can be prevented.

According to the present invention, the holder of the saw can choose to have the edge of the blade covered or to leave it uncovered. Moreover, because no spring is used inside the handle, the construction is simple, and it is possible to provide a folding saw equipped with a protective cover cheaply.

What is claimed is:

1. A folding saw comprising a blade and a handle, wherein either an edge of the blade, the handle or both are curved in a concave shape, and a base end of the blade is pivotally attached to a top end of the handle having a semi-U-shaped cross section so that the blade is rotatable in such a way that at least a portion of the edge of the blade is housed in a U-shaped housing groove of the handle, wherein:

a protective cover is housed inside the housing groove of the handle for housing the blade, said protective cover being retractable with respect to the housing groove, and when the blade is folded, the protective cover projects out of the hong groove of the handle, thereby covering a portion of the edge of the blade that is exposed from the housing groove; and wherein the protective cover housed inside the housing of the handle is retractable into the housing groove by rotating around a pivot located adjacent a bottom end of the handle, and is urged by a first spring positioned between the pivot and the bottom end of the handle so that the protective cover is biased in the housing groove, and when a top end of the folded blade pushes against a portion of the protective cover between the pivot and the bottom end of the handle, the protective cover pivotally projects out of the housing groove, against a resiliency of the first spring, so that the protective cover is pushed out of the housing groove, thereby causing the protective cover to cover the edge of the blade when the blade is folded.

2. A folding saw as described in claim 1 further comprising a stopper for stopping the blade,. which is pivotally attached to the top end of the handle, at a working position at which the blade is fully opened and ready to cut and at the folding position at which the blade is fully folded, so as to forcibly hold the blade at a housed position at which the blade is folded, against the resiliency of the first spring of the protective cover.

* * * * *